US009137111B2

(12) United States Patent
Jubran et al.

(10) Patent No.: US 9,137,111 B2
(45) Date of Patent: Sep. 15, 2015

(54) DISCOVERING, VALIDATING, AND CONFIGURING HARDWARE-INVENTORY COMPONENTS

(71) Applicant: MICROSOFT CORPORATION, Redmond, WA (US)

(72) Inventors: Marwan E Jubran, Redmond, WA (US); Aleksandr Gershaft, Redmond, WA (US); Igor Avramovic, Bellevue, WA (US); Vitalii Tsybulnyk, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 13/647,116

(22) Filed: Oct. 8, 2012

(65) Prior Publication Data

US 2014/0101467 A1    Apr. 10, 2014

(51) Int. Cl.
*G06F 15/16* (2006.01)
*H04L 12/24* (2006.01)
*G06F 12/00* (2006.01)

(52) U.S. Cl.
CPC ............ *H04L 41/0856* (2013.01); *H04L 41/12* (2013.01); *Y04S 40/162* (2013.01); *Y04S 40/164* (2013.01)

(58) Field of Classification Search
USPC .................. 709/203, 220–221, 223–229, 250
See application file for complete search history.

(56) References Cited

U.S. PATENT DOCUMENTS 7,493,653 B2    2/2009  Klein
7,746,860 B2 *  6/2010  Tams et al. .................... 370/392

(Continued)

FOREIGN PATENT DOCUMENTS

EP    1250785        8/2007
EP    2362578 A1    8/2011

(Continued)

OTHER PUBLICATIONS

"Understanding Systems Management Server (SMS)", Retrieved on: Dec. 29, 2011, 11 pages, Available at: http://www.tech-faq.com/understanding-systems-management-server-sms.html.

(Continued)

*Primary Examiner* — Zarni Maung
(74) *Attorney, Agent, or Firm* — Ben Tabor; Kate Drakos; Micky Minhas

(57) ABSTRACT

Methods, systems, and computer-readable media for automatically validating and configuring an inventory of hardware to interact seamlessly with a cloud-computing fabric of a data center are provided. Initially, devices internal to the hardware inventory are located by sending and receiving messages via out-of-band communication channels and network communication channels, respectively. Locating the internal devices involves establishing communication from a user device to the hardware inventory and selecting at least one of the internal devices for conducting a discovery process thereon. The discovery process involves receiving a first network identifier via the out-of-band communication channel and receiving a second network identifier via the network communication channel. When the first and second network identifiers match, the interconnection of the selected device is validated. Otherwise, one or more remedial measures are initiated with respect to the selected device. Validation involves conducting a server boot within the MOS and executing validation and configuration tools.

19 Claims, 8 Drawing Sheets

(56) References Cited

U.S. PATENT DOCUMENTS

| | | | |
|---|---|---|---|
| 8,625,596 | B1 | 1/2014 | Thomas et al. |
| 8,949,389 | B1 | 2/2015 | Rimmer |
| 2005/0060413 | A1 | 3/2005 | Oyadomari et al. |
| 2006/0094291 | A1 | 5/2006 | Caveney et al. |
| 2006/0282529 | A1 | 12/2006 | Nordin |
| 2007/0005994 | A1 | 1/2007 | Bahali et al. |
| 2007/0088630 | A1 | 4/2007 | MacLeod et al. |
| 2007/0180059 | A1 | 8/2007 | Marl et al. |
| 2008/0259816 | A1 | 10/2008 | Archer et al. |
| 2009/0210735 | A1 | 8/2009 | Brown et al. |
| 2010/0131948 | A1 | 5/2010 | Ferris |
| 2010/0153482 | A1 | 6/2010 | Kim et al. |
| 2010/0211656 | A1 | 8/2010 | Pagan et al. |
| 2010/0235484 | A1 | 9/2010 | Bolan et al. |
| 2011/0022245 | A1 | 1/2011 | Goodrum et al. |
| 2011/0072255 | A1 | 3/2011 | Gopalakrishnan et al. |
| 2011/0078680 | A1 | 3/2011 | Lagergren et al. |
| 2011/0145392 | A1 | 6/2011 | Dawson et al. |
| 2011/0231822 | A1 | 9/2011 | Sabin et al. |
| 2011/0270962 | A1* | 11/2011 | Tameshige et al. ........... 709/223 |
| 2011/0295633 | A1 | 12/2011 | Bird |
| 2011/0296069 | A1 | 12/2011 | Tarta et al. |
| 2011/0320849 | A1 | 12/2011 | Cochran et al. |
| 2012/0102186 | A1 | 4/2012 | Rewaskar et al. |
| 2012/0151040 | A1 | 6/2012 | Mouravyov et al. |
| 2012/0209981 | A1 | 8/2012 | Bolan et al. |
| 2012/0303767 | A1 | 11/2012 | Renzin |
| 2013/0007737 | A1 | 1/2013 | Oh et al. |
| 2014/0039683 | A1* | 2/2014 | Zimmermann et al. ...... 700/275 |
| 2014/0119238 | A1 | 5/2014 | Thomas et al. |
| 2014/0298734 | A1 | 10/2014 | Rogers |

FOREIGN PATENT DOCUMENTS

| | | | |
|---|---|---|---|
| GB | 2421153 | A | 6/2006 |
| WO | 2010119370 | A1 | 10/2010 |
| WO | 2011151773 | A1 | 12/2011 |
| WO | WO 2011159842 | | 12/2011 |

OTHER PUBLICATIONS

Bourgeau, Paul, "Cloud Security: Managing the Cloud with Windows Intune", Published on: Jun. 2010, 6 pages, Available at: http://technet.microsoft.com/en-us/magazine/f742836.aspx.

Hirschfeld, et al., "Bootstrapping OpenStack Clouds", Published on: Dec. 29, 2011, 15 pages Available at: http://www.rackspace.com/downloads/pdfs/dell_tech_wp-bootstrapping_openstack_clouds.pdf.

Final Office Action in U.S. Appl. No. 13/531,136, mailed Jan. 13, 2014, 27 pages.

International Search Report and Written Opinion in PCT/US2013/046670, mailed Oct. 9, 2013, 10 pages.

International Search Report and Written Opinion in PCT/US2013/060244, mailed Feb. 4, 2014, 16 pages.

International Search Report & Written Opinion for PCT Patent Application No. PCT/US2013/074742, Mailed Date: Apr. 4, 2014, Filed Date: Dec. 12, 2013, 14 Pages.

"Bootstrapping Applications via AWS CloudFormation", Retrieved on: Dec. 28, 2011, 22 pages Available at: https://s3.amazonaws.com/cloudformation-examples/BoostrappingApplicationsWithAWSCloudFormation.pdf.

"Configuring the Hardware and Software Inventory SMS Feature", Retrieved on: Dec. 30, 2011, 6 pages Available at:http://www.techfaq.com/configuring-the-hardware-and-software-inventory-sms-feature.html.

"Just Released: StockTrader 5.0, Windows Azure Platform End-to-End Sample Application", Published on: Jun. 30, 2011, 1 page Available at:http://blogs.msdn.com/b/windowsazure/archive/2011/06/30/just-released-stocktrader-5-0-windows-azure-platform-end-to-end-sample-application.aspx.

"System Imaging", Retrieved on: Jul. 20, 2011, 2 pages Available at:http://itservices.stanford.edu/strategy/sysadmin/imaging.

"Vyatta Network OS for Cloud Computing", Retrieved on: Dec. 28, 2011, 3 pages Available at:http://www.vyatta.com/sites/vyatta.com/files/pdfs/vyatta_cloud_datasheet.pdf.

"Windows Azure Bootstrapper", Retrieved on: Dec. 28, 2011, 2, pages Available at:http://bootstrap.codeplex.com/.

Casado, et al., "Ripcord: A Modular Platform for Data Center Networking", In Proceedings of the ACM SIGCOMM 2010 conference on SIGCOMM, Jun. 7, 2010, 15 pages.

International Search Report and Written Opinion in PCT/US2013/022358, mailed Jun. 21, 2013.

Mudigonda, et al., "NetLord: A Scalable Multi-tenant Network Architecture for Virtualized Datacenters", Published on: Aug. 15-19, 2011, 12 pages Available at:http://www.hpl.hp.com/personal/Praveen_Yalagandula/papers/SIGCOMM2011-NetLord.pdf.

Non Final Office Action in U.S. Appl. No. 13/531,136, mailed May 8, 2013.

Perera, et al., "A Scalable and Robust Coordination Architecture for Distributed Management", In Department of Computer Science Technical Report TR-659, Indiana University, 2008, 10 pages.

Non-Final Office Action mailed May 12, 2014 in U.S. Appl. No. 13/360,876, 19 pages.

Final Office Action dated Dec. 9, 2014 in U.S. Appl. No. 13/360,876, 21 pages.

Second Written Opinion of the International Searching Authority dated Dec. 19, 2014 in Application No. PCT/US2013/074742, 10 pages.

Final Office Action dated Feb. 10, 2015 in U.S. Appl. No. 13/531,136, 15 pages.

European Office Action dated Mar. 3, 2015 in Application No. 13734578.1, 2 pages.

International Preliminary Report on Patentability dated Mar. 23, 2015 in PCT Patent Application No. PCT/US2013/074742, 18 pages.

Non-Final Office Action dated May 21, 2015 in U.S. Appl. No. 13/715,273, 12 pages.

Supplementary Search Report Issued in European Patent Application No. 13743254.8, Mailed Date: May 29, 2015, 5 Pages.

Office Action issued in European Patent Application No. 13771681.7, Mailed Date: May 18, 2015, 2 pages.

* cited by examiner

DISCOVERING, VALIDATING, AND CONFIGURING HARDWARE-INVENTORY COMPONENTS

CROSS-REFERENCE TO RELATED APPLICATIONS

This application is related in subject matter to U.S. patent application Ser. No. 13/360,876, filed Jan. 30, 2012, now pending, entitled "AUTOMATED BUILD-OUT OF A CLOUD-COMPUTING STAMP," herein incorporated by reference.

BACKGROUND

Generally, distributed service applications are hosted in cloud-computing networks (across various nodes) and are intended primarily to promote high availability through redundancy of service-application components, dynamic scalability, and auto-healing functionality. These service applications are often divided into portions that include a group of service-application components. These service-application components may be hosted throughout nodes (e.g., physical machines and virtual machines) of one or more data centers. Often, there exists a need to create or expand the computing/storage capacity of these data centers to accommodate usage demands of the service applications and to help ensure that an entire service application does not become unavailable due to a lack of support from the underlying hardware.

Expansion of the data centers may involve various scenarios, such as configuring a new set of hardware or reconfiguring an existing set of hardware to operate in concert with the existing nodes within the data centers. In one example, a new set of racks that each accommodates a plurality of blades may be targeted for being integrated within a fabric that interconnects the data center nodes. This fabric helps ensure that the service-application components distributed across the existing nodes and the newly added hardware such as racks, network devices (L2/3 switches, routers, load balancers), power and serial devices, and blades are able to interact as if each service application was running on its own independent computing device.

When conducting an expansion of a data center, the steps for integrating the new set of hardware into the fabric are presently manually conducted. These manually conducted steps are often time-consuming, ineffective, and inconsistent in result, thus, potentially leading to service interruptions within the fabric. Accordingly, an automated end-to-end process that builds out a set of designated hardware for deployment into a fabric would help achieve an efficient, robust, and scalable framework for expanding the computing/storage capacity of a data center.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for carrying out an automated bootstrap process that verifies a physical topology of an inventory of nonconfigured hardware and integrates/deploys the hardware inventory as a fabric-computing cluster (FCC) within a cloud-computing fabric of a data center. The automated manner in which the bootstrap process is implemented avoids the problematic fallout (discussed above) that precipitates from manually executed procedures for reconfiguring or adding capacity to a data center. Accordingly, in embodiments of the present invention, the automated bootstrap process enables building out the hardware inventory and incorporating it into the cloud-computing fabric in a consistent and effective fashion.

In general, the bootstrap process is triggered upon receiving an indication to create or expand computing/storage capacity of a data center. In embodiments, the data center includes a plurality of nodes (e.g., physical machines or virtual machines), network devices, serial devices, power devices, and other equipment that are operably interconnected and managed via the cloud-computing fabric. The fabric provides underlying support for service applications that are distributed throughout the data centers. In particular, portions (e.g., roles instances or program components) of these service applications that are distributed throughout nodes may be managed by a controller of the fabric. The fabric controller is generally responsible for various duties surrounding the monitoring, maintenance, and management of the health of computer resources, network gear, serial devices, and power units that support the underlying functionality of the fabric.

In an exemplary embodiment, the bootstrap process is performed in independent phases upon being triggered by an event (e.g., call to expand capacity of the data center). These phases are carried out by executing self-contained workflows, respectively, and are generally depicted in FIG. 2. Initially, a coauthoring phase may be conducted for specifying an initial set up of an inventory of hardware. This phase involves a workflow for implementing one or more of the following processes: receiving a customer's dependency schema that specifies the additional capacity required on the customer's premises; identifying the hardware that meets the dependency schema; interfacing with the customer to gather values for configuring the identified hardware; generating a symbolic representation from the values; validating configuration using the symbolic representation upon delivery of the hardware; and preparing a template file that memorializes a layout of the topology.

Upon preparing the template file, the phases that involve discovery and validation of network devices and hardware devices may be commenced. The workflows for performing discovery and validation for each of these devices generally involve user device(s) that communicate with the network devices via network-based connection and/or a serial-based connection to discover a physical topology (e.g., interrack locations and a wiring arrangement) surrounding the hardware devices. These user device(s) may cross-reference the discovered physical topology against the template file to validate the hardware devices. Once the topology physical/logical configuration is fully generated, the deployment of a new fabric instance, or the expansion of an existing fabric instance can commence.

Next, the user device(s) may initiate communication with a cloud-computing fabric of a data center to effectuate the phases that deploy the hardware inventory within the fabric of the data center as a fabric-computing cluster (FCC) and provision security on the FCC. These phases involve various workflows that support setting up the hardware cluster to interact with resources and existing hardware within the data center. In addition, these workflows may include the following steps: preparing an infrastructure state from information gathered upon verifying the physical topology of the hardware inventory; integrating the hardware inventory within the fabric of the data center by sharing the infrastructure state with a fabric controller; deploying services running on the fabric within the hardware inventory; and designating the hardware inventory as a data center FCC. Accordingly, when carried out in succession, these phases of the bootstrap process promote end-to-end automation for building out a hardware inventory and for integrating the hardware inventory within a fabric of a data center. This end-to-end automation may further achieve an efficient, robust, and scalable framework either within the hardware inventory preestablished within the data center (e.g., reconfiguring an existing FCC to represent a new FCC instance within the data center), or at a site external to the data center (e.g., integrating a remote hardware inventory as a new FCC instance within the data center).

BRIEF DESCRIPTION OF THE DRAWINGS

Embodiments of the present invention are described in detail below with reference to the attached drawing figures, wherein.

DETAILED DESCRIPTION

Figure 1:
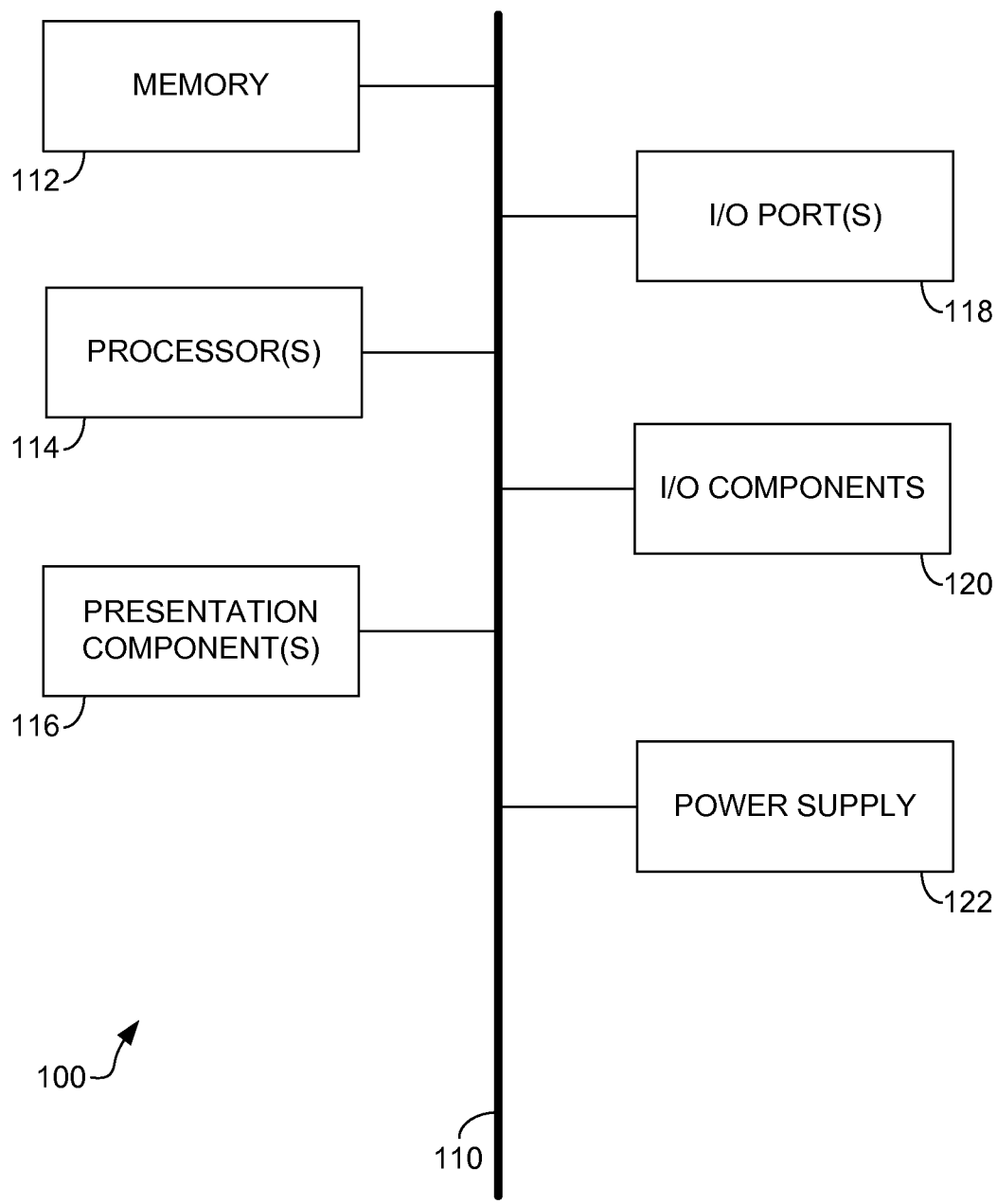
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Aspects of the invention focus upon the discovery and validation phase within a bootstrap process, where the bootstrap process is designed to achieve an efficient, robust, and scalable framework to incorporate a cloud operating system (Windows Azure) on designated hardware regardless of the location. This discovery and validation phase involves the discovery, validation, and configuration of network devices and computer hardware as part of initial build-out of a hardware inventory and a device return manufacture authorization (RMA) scenario. The workflows associated with the discovery, validation, and configuration for each of these elements rely, in part, on the information (e.g., expected topology description) previously gleaned in the coauthoring phase. Also, these workflows can be carried out by the same ecosystem, which involves a user device (e.g., mobile device, laptop, or utility box) with configuration software hooked into the hardware inventory in order to perform discovery, validation, and configuration.

As discussed more fully below, embodiments of this invention introduce technology within a cloud-computing fabric to automatically discover and validate an unrefined set or inventory of hardware in order to eventually merge that hardware inventory with a data center. As used herein, the phrase "hardware inventory" is not meant to be limited to any particular configuration of components, but broadly refers to any compilation of devices (e.g., network devices, computing devices, and power-supply devices) that may be eventually integrated within the fabric. In one instance, the hardware inventory may be located within a private enterprise network managed by a customer of a cloud-computing-network service provider, where implementing the bootstrap process as an appliance on this type of hardware inventory allows for remote reachability between the data center and the private enterprise network. In another instance, the hardware inventory may be located within the data center managed by the cloud-computing-network service provider, where implementing the bootstrap process allows for building out local storage/computing capacity of the data center.

In an exemplary embodiment, the hardware inventory represents a system that is comprised of any number of the following: network gear (e.g., switches, routers, and load balancers) power devices, serial devices, blade(s) (e.g., computing and/or storage devices), and components within the blade(s) (e.g., BIOS, drives, device firmware). Accordingly, various systems may be categorized as the hardware inventory, and the phrase hardware inventory is not limited to the exemplary systems described herein.

Further, the hardware inventory may be equipped to communicate with external device(s) (e.g., laptop configured to run and manage the bootstrap process of the hardware inventory) and/or internal device(s) (e.g., blades for performing compute and storage operations) via one or more channels. These channels may include a serial-based channel ("serial communication channel") and a network-based channel ("network communication channel"). The serial communication channel represents an out-of-band connection that provides a hook-up between the hardware inventory (e.g., blades on racks) and a set of serial devices (e.g., Digi® connector device). Typically, management of the hardware inventory over the serial communication channel is conducted before setting up the networking capability on each of the hardware devices. The serial communication channel is used to enable the networking capability. The network communication channel represents an in-band connection for providing a network link between the external and/or internal devices of the hardware inventory with various network locations. For example, the network communication channel may include network-management Ethernet wires that use in-band signaling to exchange call-control information. The two channels may be implemented using the same medium (e.g. Ethernet) depending on the hardware configuration.

As will be discussed more fully below, the bootstrap process features end-to-end automation using one or more workflow engines (running on a user device 310 of FIG. 5) that drive the orchestration and execution of various phases comprising the bootstrap process. In embodiments, these phases can be carried out as independent workflows such that each phase may be invoked and driven to completion separately without reliance on concurrent operation of another phase or workflow. By allowing the phases to be carried out independently in a self-contained manner, each phase consistently delivers incremental improvements to hardware inventory without any adverse interactions of previous or subsequent workflows.

As will be apparent in the following discussion, a majority of the discussion below will focus on the workflows surrounding the discovery and validation phase of the bootstrap process. In operation, these workflows are designed to achieve the various goals of the discovery and validation phase, such as ensuring that the wiring internal to the server racks (e.g., connections between servers, serial access devices, and PDUs) and, potentially, external to the server racks (e.g., network connections between server racks) is as expected by conducting wire checks to verify physical connections between devices. Another goal of the discovery and validation phase is to configure devices of the hardware inventory with production settings (e.g., credentials and protocol type). Upon configuring the device with production settings, workflows are employed to confirm that the production settings, as well as the network configuration of the hardware inventory, allows for access to or network connectivity with the servers via one or more switches. Improper network configurations, which are being detected and cured by the workflows, typically prevent expected interaction with the servers even when the wiring surrounding the servers is correct (e.g., data packets will not properly traverse network connections from the switches to the servers).

Yet another goal of the discovery and validation phase is to check that the configuration and functionality of the servers and their components match against a predefined template file. One embodiment of matching against the template file involves checking the existence and performance of memory, hard drives, and other hardware components installed to the servers against a hardware schema to ensure sufficient memory exists such that the servers may properly operate within the context of a cloud-computing fabric. The template file may be prepared, in part, using the SKU definition developed during the coauthoring phase of the bootstrap process. The SKU definition is discussed in greater detail in U.S. application Ser. No. 13/531,136, filed Jun. 22, 2012, now pending, entitled "Establishing an Initial Configuration of a Hardware Inventory," herein incorporated by reference.

Yet another goal of the discovery and validation phase is to verify the devices within the hardware inventory are running a supported version of internal software (e.g., firmware, drivers, and Bios). That is, discovery and validation phase employs workflows to detect when noncompliant, out-of-date, or manufacturer-developed software is running on the devices. If non-conforming software is detected, workflows are employed to perform an upgrade to ensure compliance at the time of deployment with the bootstrap process.

Having briefly described an overview of embodiments of the present invention, an exemplary operating environment suitable for implementing embodiments of the present invention is described below.

Operating Environment

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disk drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Phases of the Bootstrap Process

Figure 2:
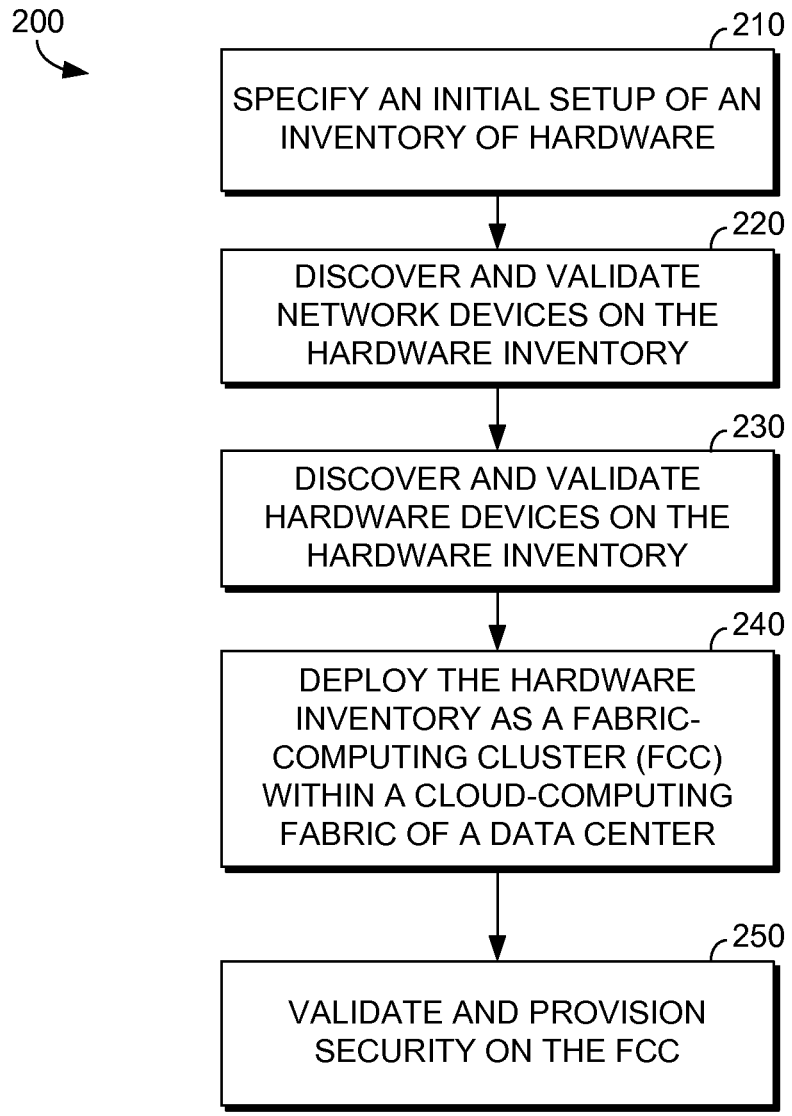
FIG. 2 is a flow diagram showing exemplary phases of a bootstrap process for incorporating an inventory of hardware into a cloud-computing fabric of a data center, in accordance with an embodiment of the present invention.

Turning to FIG. 2, a general discussion of the individual phases of the bootstrap process for establishing interoperation between an inventory of hardware and a cloud-computing fabric of a data center will now be discussed. Generally, FIG. 2 illustrates a flow diagram 200 that shows five exemplary phases of a bootstrap process for incorporating the hardware inventory into the fabric of a data center, in accordance with an embodiment of the present invention. In embodiments, building out the hardware inventory as a fabric-computing cluster (FCC) using the phases discussed below may be carried out by a configuration software (see reference numeral 311 of FIG. 3) on a user device (see reference numeral 310 of FIG. 3). The user device, along with the hardware inventory, data center, and/or other network device, acts in concert to form various ecosystems that implement one or more phases of the bootstrap process.

Returning to FIG. 2, as depicted at block 210, the first phase of the bootstrap process includes a workflow for specifying an initial set-up of the hardware inventory. Generally, the workflow results in generating the logical/physical configuration needed to deploy the fabric network between blocks 230 and 240. During the first phase, the workflow may involve gaining an understanding about an initial configuration of the hardware inventory before releasing the hardware inventory as an FCC of the data center. For instance, the first-phase workflow may attempt to validate the initial configuration of the hardware inventory to ensure it corresponds with an expected hardware layout (e.g., device locations, IP addresses, VLANs, and wiring) and to ensure it meets certain regulations enforced by the data center (e.g., flagged unsecure components are absent and desirable communication components are present).

In an exemplary embodiment, the workflow of the first phase is concerned with verifying that the initial logical resources and the appropriate specification of those resources match a supported configuration. One instance of verifying may involve determining whether there are sufficient network resources (e.g., IP addresses, VLANs, ports, and the like) provided in the configuration to match the desired configuration articulated by the specification. For example, the first-phase workflow may verify that at least one IP address is provided per machine if such a condition exists within the specification.

Another instance of verifying may involve determining whether there exists an overlap of the configuration with known existing ranges (e.g. accidentally provided resources that are presently in use). Yet another instance of verifying may involve determining whether the planned set of resources constitutes a supported configuration (e.g., are there enough of each required resource to meet the specification, is the combination of these type of resources supported, is the detected TOR switch compatible with the detected blades). Still another instance of verifying involves determining whether interaction with the end-user/customer is needed to gather resources required for the execution (e.g., passwords, addresses, IP blocks, VLANs, and the like).

As depicted at block 220, a second phase for discovering and validating network devices and wiring checks may be implemented on the hardware inventory. In embodiments, the workflow of the second phase may involve communicating with a top-of-rack (TOR) switch and a serial-access device of the network devices via a serial-based connection and a network-based connection, respectively. Further, the second-phase workflow may involve sending instructions over one or more of the connections that prompt the TOR switch and/or the serial-access device to selectively induce hardware devices (e.g., processors, processing units, computing devices, servers, and blades inserted into a rack) to send traffic to the user device for analysis and may involve the use of a power distribution unit (PDU) to selectively power-cycle the devices to reset their state. This analysis may include discovering and validating the hardware devices, as depicted at block 230. That is, the third phase of the bootstrap process employs data packets that are carried from the hardware devices to the user device. A workflow of the third phase may involve parsing the content (e.g., payload and header) of the data packets to determine the location or absence of, configuration of, and internal connections to the hardware devices.

In embodiments, the third-phase workflow may also send specific workflows, tools, etc. to the various devices and/or blades to perform validation, update and/or configuration of hardware and/or software components (e.g., BIOS and device firmware) within the devices/blades themselves. In other embodiments, the workflow of the third phase may execute "smoke tests," which serve to verify that components with the devices/blades are functional and meet the fabric requirements. Further, the third-phase workflow may identify the model, manufacturer, and firmware version of devices/blades for recordation and eventual use.

As depicted at block 240, the fourth phase of the bootstrap process involves deploying the inventory as an FCC instance within the fabric of the data center. In an exemplary embodiment, the fourth-phase workflow may involve sharing with the fabric an infrastructure state of the hardware inventory (e.g., generated during at least one of the previous phases) and installing services on the hardware inventory that allow for interaction with the fabric. Installing services onto the hardware inventory may correspond with one of multiple scenarios, which are discussed in the paragraph below. As depicted at block 250, the fifth phase of the bootstrap process involves cluster-wide validation and provisioning of the security measures on the hardware inventory once it is designated as an FCC instance. In an exemplary embodiment, the fifth-phase workflow may involve passing data (e.g., device credentials, original certificates, private keys, and passwords) between a secret store associated with the new FCC instance and a controller of the fabric.

Although five distinct phases of the bootstrap process have been described, it should be understood and appreciated that other types of suitable arrangements of workflows that help advance the incorporation of the hardware inventory within a fabric of a data center may be used, and that embodiments of the present invention are not limited to the five phases described herein. For instance, embodiments of the present invention contemplate dividing a workflow of an individual phase (e.g., phase five) into separate workflows (e.g., cluster-wide validation and security provisioning) that can be performed in a mutually exclusive fashion.

Examples of the multiple scenarios for installing services onto the hardware inventory will now be described. In one scenario, the hardware inventory represents equipment that is new to the data center and that is not previously configured. Accordingly, the new hardware is configured to operate transparently with existing resources of the data center and is cleanly integrated within the data center as a new FCC instance or cloud-computing stamp that is managed by a controller of the cloud-computing fabric.

In another scenario, the hardware inventory represents a local extension of the data center that is added upon the data center requesting additional storage/computing capacity. The local extension may include a rack of blades that build out to allow for management by a fabric controller. In embodiments, the process of building out involves discovering a wiring pattern of the blades within the rack, validating the wiring pattern against a predefined template file, and approving the blades for incorporation into the data center. In effect, building out the blades helps to ensure that any latent wiring issues or hardware issues (e.g., physical defects missing parts, invalid versions of parts, or improper configuration) within the rack are detected and addressed, thereby ensuring that incorporation of the blades within the data center will not adversely impact the live underlying support being offered by the data center to services running thereon.

In yet another scenario, the hardware inventory is configured with its own instance of a cloud-computing fabric that is separate and partitioned from the fabric currently intercoupling resources of the data center. Thus, upon incorporation of the hardware inventory into the data center, the data center will run at least two cloud-computing fabrics (e.g., operating systems) that function to isolate services assigned to the newly bootstrapped hardware inventory from services assigned to the original data center. In this way, separate fabrics may be dedicated to services of particular customers, thereby virtually and physically excluding/protecting some services from others within the data center (e.g., build-out/bootstrap in a data-center container).

In still another scenario, referred to as a return manufacture authorization (RMA) scenario, the hardware inventory represents computing device(s) or other devices (e.g., network, PDU, and serial) that are deemed unreachable (e.g., inoperable or disconnected) by the controller of the fabric of the data center (hereinafter "fabric controller"). During lifecycle management of hardware, the fabric controller may periodically solicit a status of computing devices (e.g., physical machines and/or virtual machines) aggregated within the data center. Soliciting the status may involve communicating requests to agents running on the computing devices, respectively, and receiving health information in return. If the fabric controller is unable to reach a particular computing device for any reason (e.g., a network device that interconnects the computing device to the fabric controller fails), the fabric controller can raise an alert that indicates the hardware inventory is unreachable.

Upon recognizing the hardware inventory as unreachable, the fabric controller may initiate an auto-healing procedure. In embodiments, the auto-healing procedure includes at least the steps of evacuation and validation, where validation is often carried out within one or more phases of the bootstrap process as well. The step of evacuation may involve transferring services (e.g., customer-owned applications and system-based applications) consuming resources on the unreachable hardware inventory to a replacement hardware inventory. As such, evacuation ensures that the auto-healing procedure is transparent to the customers of the data center because the visibility to their services is not impacted during validation and maintenance.

Once the evacuation is successfully performed, the step of validation is invoked. In an exemplary embodiment, the step of validation includes carrying out a workflow of the bootstrap process that verifies configuration settings of components residing within the unreachable hardware inventory and cross-references a detected physical topology (e.g., links between components and wiring between devices) of the unreachable hardware inventory against an expected physical topology (e.g., provided within the template file) of the unreachable hardware inventory. As such, the step of validation determines whether the unreachable hardware inventory is properly configured to interact with drivers of the fabric controller, where the drivers are designed to interact with specific hardware configurations.

As more fully discussed below, the step of validation involves taking the unreachable hardware inventory offline, which is the reason for conducting the step of evacuation beforehand. Generally, the unreachable hardware inventory is taken offline because several destructive actions occur that would interrupt the execution of services on devices of the unreachable hardware inventory and/or on devices of the data center. These destructive actions may include one or more of the following: manipulating a flow of power (e.g., turning on and off) to a blade by requesting a serial-access device to selectively drive a power (via a PDU) thereto; gathering information from traffic sent from the manipulated blade; extracting information (e.g., MAC address of the blade) from content of data packets sent within the traffic; and verifying the location and wiring of the blade by evaluating the extracted information against the template file and performing validations. It should be noted that the serial-access device is typically used for out-of-band communication, while the top-of-rack (TOR) switch employs in-band communication (e.g., via the Ethernet).

In an example of selectively driving power to the blade, the fabric controller may turn off power to a range of ports that feed the blades of the unknown/invalid hardware inventory. Next, the fabric controller may directly or indirectly instruct the PDU to turn on power to a selected port that links to a subject blade. The fabric controller may then read the MAC address from data packets being sent from the subject blade that is currently sending traffic. Thus, connectivity of the subject blade is verified when the selected port corresponds with an expected port of the template file. Beyond verifying the selected port for receiving power from the PDU, the step of validation may further involve using a TOR switch to determine which port—within a range of ports allocated to blades of the hardware inventory—is connected to the subject blade. This determination is made by identifying a subject port of the port range that is receiving the data packets being delivered from the subject blade.

Introduction of the Discovery and Validation Phases

Figure 3:
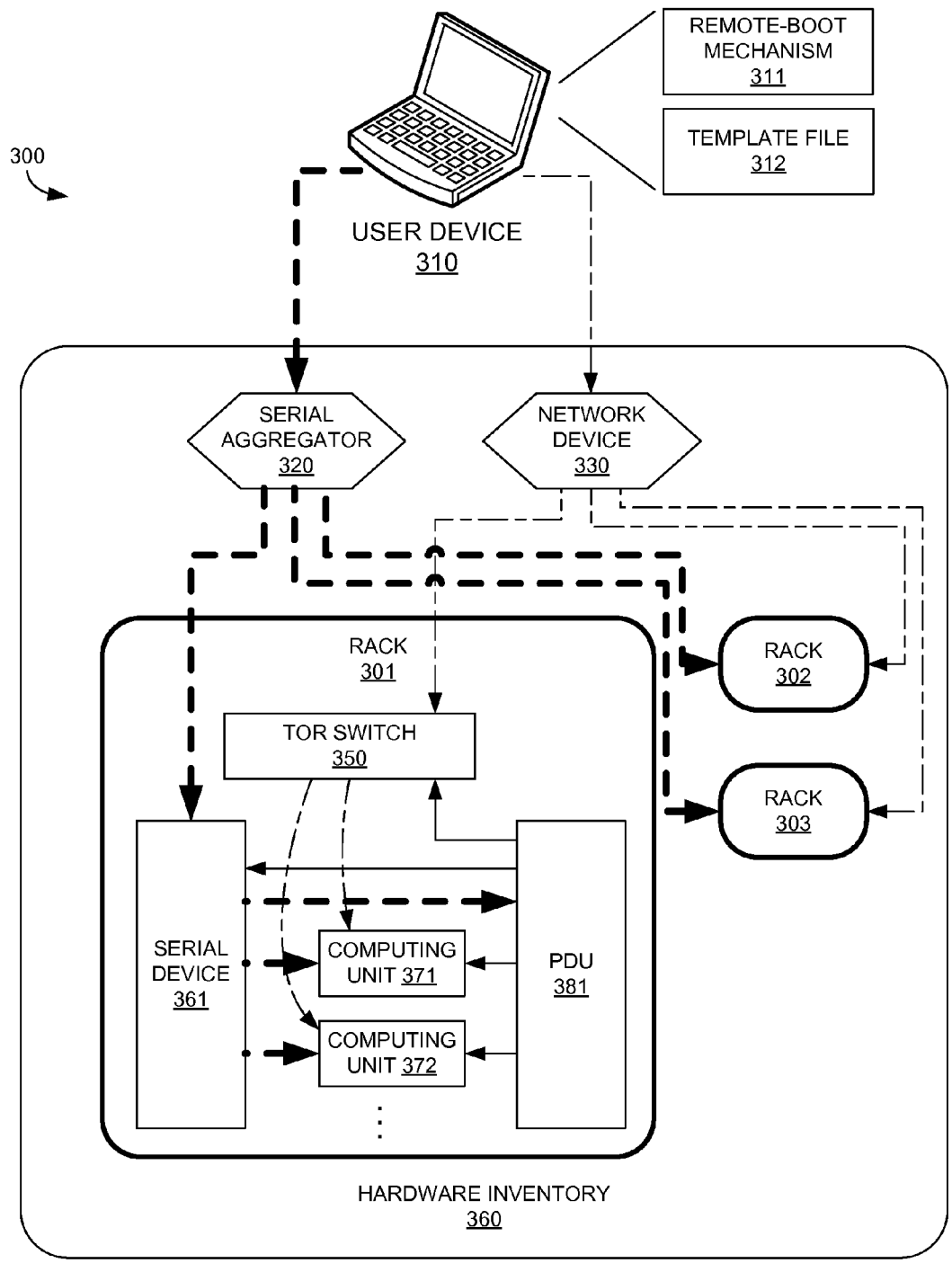
FIG. 3 is a graphical representation illustrating an exemplary verification ecosystem for discovering, validating, and configuring a physical topology of an inventory of hardware, the verification ecosystem being suitable for use in implementing embodiments of the present invention.

The discovery and validations phases (see blocks 220 and 230 of FIG. 2) are substantially directed to verifying interdevice wiring of a hardware inventory and installing particular software within the hardware inventory. With reference to FIG. 3, a graphical representation illustrating an exemplary verification ecosystem 300 for discovering, validating, and configuring a physical topology of an inventory of hardware 360 is employed to assist in describing the wiring verification and the software installation. Initially, the verification ecosystem 300 includes a user device 310 that is communicatively coupled with components of the hardware inventory 360. In an exemplary embodiment, the communicative coupling is organized into at least a network-based connection (shown as thin dashed lines) and a serial-based connection (shown as thick dashed lines). As illustrated in FIG. 3, the serial-based connection involves a communication path between the user device 310 and a serial aggregator 320, where the serial aggregator 320 is responsible for properly distributing instructions from the user device 310 to an appropriate serial device (e.g., by processing addresses carried within data packets streaming from the user device 310). For instance, the serial aggregator 320 may represent a hub-like mechanism that communicates with and talks to multiple serial devices (e.g., connects to multiple Digi® devices in multiple racks).

The network-based connection involves a communication path between the user device 310 and a TOR switch 350 via a network device 330. In one example, the network device may represent an L3 aggregator switch, where the L3 aggregator switch is responsible for properly delivering data packets from the TOR switches 350 to the user device 310 (e.g., aggregates data packets from multiple network devices). It should be noted that the network device 330 may be configured to aggregate and communicate with multiple TOR switches, where the network device serves as a parent node of the TOR switches and, occasionally, as a child node to other high-level routers.

In operation, the network device 330 may act as an uplink between an existing infrastructure and the hardware inventory 360. Accordingly, the network device 330 serves to selectively isolate the hardware inventory 360 from the rest of an existing infrastructure (e.g., data center), as well as the Internet. As more fully discussed below, by ensuring that there is no broadcast traffic entering or leaving through the uplink, the network device 330 helps negate any impact upon external services currently running on the existing infrastructure.

In this way, the verification ecosystem 300 operates in a self-contained manner that confines messaging to intercommunication between the user device 310 and the hardware inventory 360 in order to ensure proper isolation between the hardware inventory 360 being built out and an existing infrastructure. This isolation is useful in at least the following two respects: providing a higher reliability during the bootstrap process by limiting external interference; and ensuring any currently live hardware within the existing infrastructure is not impacted by the bootstrap process. In embodiments, the isolation is configured as a security boundary that serves as a virtual layer separating the existing infrastructure and the hardware inventory 360, which cannot be considered as trusted until each of the phases succeed. Accordingly, the bootstrap process itself does not depend on a security context of the existing infrastructure—generally, during the final phases of the bootstrap process (prior to the validation and provisioning phase) the security credentials/tokens are set up.

Architecture of the Verification Ecosystem

The configuration of the verification ecosystem 300 will now be discussed. Initially the ecosystem 300 includes the user device 310 for linking to and controlling functionality of racks 301, 302, and 303 within the hardware inventory 360. With respect to the rack 301 (e.g., high-density rack), there exists one or more power-distribution units (PDUs) 381, blades (e.g., computing units 371 and 372), serial devices 361, and network devices (e.g., TOR switch 350). It should be noted that there may be additional TOR switches per rack (e.g., upper and lower TOR devices). The computing units 371 and 372 are designed to act as processors to carry out computing/storage tasks and are configured by OEM to individually generate data packets upon respectively receiving power. In one instance, the computing units 371 and 372 represent servers that are arranged and deployed within the rack 301. The PDUs are designed to selectively supply and aggregate power to the computing units 371 and 372. The TOR switch 350 is configured for sending data packets over the network-based connection, while the serial device 361 is configured for invoking generation of the data packets upon receiving instructions over the serial-based connection. In embodiments, the serial device 361 may be used to configure devices within the rack (e.g., PDUs, TOR switches, and blades).

The hardware inventory 360 may further include a serial aggregator 320 and a network device 330 that interconnect the racks 301-303 within the user device 310. The serial aggregator 320 aggregates and talks with multiple serial devices 361 of various racks 301 via serial communication channels (thick dashed lines). The network device 330 (e.g., aggregator switch) aggregates and talks with multiple TOR switches via network communication channels (thin dashed lines). As can be seen, the network equipment (e.g., network device 330 and TOR switch 350) and the serial routers (e.g., serial aggregator 320 and serial device 361) are generally organized in a tree-shaped topology, where there exists fewer connections when moving upward along the tree toward the user device 310.

The user device 310 includes configuration software that is designed to drive at least the discovery and validation phase of the bootstrap process. The configuration software is communicatively coupled to the TOR switch 350 via the network-based connection (in-band channel) and to the serial device 361 via the serial-based connection (out-of-band channel). In embodiments, the discovery and validation phase of the bootstrap process comprise: discovering the network devices (TOR switch 350 and serial devices 361) and the set of blades (computing units 371 and 372); and validating a location of the set of blades by comparing information carried within the data packets against a template file 312 that describes a physical topology of the rack 301. As discussed above, the template file 312 is generated upon completing the phase of specifying the initial set-up of the hardware inventory 360.

The serial device 361 (e.g., DIGI) uses an out-of-band access method for establishing connectivity to the PDU 381 and to each of the computing units 371 and 372. In operation, the serial device 361 aggregates the serial connections of the computing units 371 and 372. The serial device 361 is further configured to receive the instructions from the configuration software and, upon processing the instructions, to control the PDU 381. In one instance, controlling the PDU 381 involves conveying instructions thereto. Upon receiving and reading the instructions, the PDU 381 may be configured to deliver power to at least one selected blade of the computing units 371 and 372, and to withhold power from at least one nonselected blade. In response, the selected blade(s) may commence generation of data packets that are aggregated at the TOR switch 350 and subsequently at the network device 330 before being routed to the configuration software. On the other hand, the nonselected blade(s) will likely abstain from sending data packets. Thus, the configuration software is able to confirm the internal connections between the network devices 330 and TOR switch 350, the computing units 371 and 372, the PDU 381, and the serial devices 320 and 361 as a function of a comparison between a location the blades selected by the instructions and the origination addresses of data packets being generated within the rack 301.

Although various different configurations of network/serial devices 330 and 361 have been described, it should be understood and appreciated that other types of suitable devices and/or machines that distribute or aggregate messages may be used, and that embodiments of the present invention are not limited to the serial device 361 and TOR switch 350 described herein. For instance, multiple serial devices may be provided for the entire rack 301, where the serial devices act as a serial-access connection/interface to the PDU 381, and act as a serial connection/interface to each of the computing units 371 and 372. In another instance, a serial device 361 and the PDU 381 may be combined into a single device. In yet another instance, the TOR switch 350 may be replaced with a specialized blade that has Ethernet interface capability. Accordingly, the discovery and validation phase may be carried out using any number of network devices such that at least one network device includes in-band capabilities for network communication and at least one network device includes out-of-band capabilities for serial communication. Or, if the out-of-band capabilities are employed over the Ethernet, then a secondary network switch may be used in place of the serial device. In this way, the in-band capabilities compliment the out-of-band capabilities and allow for debugging and diagnosis of the network devices, as well as continued access to the computing units 371 and 372, if one of the capabilities falls offline.

It will be understood and appreciated by those of ordinary skill in the art that the ecosystem 300 shown in FIG. 3 is merely an example of one suitable portion of an environment for carrying out phases of the bootstrap process and is not intended to suggest any limitation as to the scope of use or functionality of embodiments of the present invention. Nor should the ecosystem 300 be interpreted as having any dependency or requirement related to any single resource or combination of resources illustrated therein. Further, although the various blocks of FIG. 3 are shown with lines for the sake of clarity, in reality, delineating various components is not so clear, and metaphorically, the lines would more accurately be grey and fuzzy.

The hardware inventory 360 includes various equipment/resources interconnected to the user device 310 via serial-based connections and/or network-based connections. This equipment/resources, as described herein, may include software components (e.g., installed in the network devices) as well as tangible hardware elements, such as racks 301, 302, and 303 and the user device 310. The equipment/resources may be distributably placed across various physical resources; thus, the user device 310 may recognize a location of the equipment/resources through the discovery and validation phases (see reference numerals 220 and 230 of FIG. 2) in order to establish communication therebetween. In addition, a network (not illustrated) may be provided that facilitates this communication over channels connecting the equipment/resources, and any other elements required by the bootstrap process. The network may include, without limitation, one or more local area networks (LANs) and/or wide area networks (WANs). Such networking environments are commonplace in offices, enterprise-wide computer networks, intranets, and the Internet. Accordingly, the network is not further described herein.

The exemplary system architecture of the ecosystem 300 includes the user device 310 and the computing units 371 and 372. Each of these devices 310, 371 and 372, shown in FIG. 3, may take the form of various types of computing devices, such as, for example, computing device 100 described above with reference to FIG. 1. By way of example only and not limitation, the devices 310, 371 and 372 may be a personal computer, desktop computer, laptop computer, consumer electronic device, handheld device (e.g., personal digital assistant), various servers, blades, and the like. It should be noted, however, that the invention is not limited to implementation on such computing devices, but may be implemented on any of a variety of different types of computing devices within the scope of embodiments of the present invention.

Typically, each of the devices 310, 371 and 372 include, or is linked to, some form of a computing unit (e.g., central processing unit, microprocessor, etc.) to support operations of the component(s) running thereon (e.g., originating data packets upon receiving a signal or being supplied power). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 310, 371 and 372 to enable each device to perform communication-related processes and other operations. In another instance, the computing unit may encompass a processor (not shown) coupled to the computer-readable medium accommodated by each of the devices 310, 371 and 372. Generally, the computer-readable medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding, interpreting, executing, and writing back instructions (e.g., reconstructing the physical gestures by presenting animations of the motion patterns).

Also, beyond processing instructions, the processor may transfer information to and from other resources that are integral to, or disposed on, the devices 310, 371 and 372. Generally, resources refer to software and hardware mechanisms that enable the devices 310, 371 and 372 to perform a particular function. By way of example only, the resources may include one or more of the following mechanisms: configuration software (not shown); a template file 312; a reboot mechanism 311, and components residing within the computing units 371 and 372.

Workflows of the Discovery and Validation Phases

The workflows of the bootstrapping process for discovering and validating the network and hardware devices within the hardware inventory 360 (see reference numerals 220 and 230 of FIG. 2) of the verification ecosystem 300 of FIG. 3 will now be described. Initially, the user device 310 is provided with configuration software running thereon that is functional to verify the equipment and components of the hardware inventory 360. Initially, the user device 310 is wired or wirelessly hooked up to the serial aggregator 320 and the network device 330 to form the serial-based connection and the network-based connection, respectively, where the serial aggregator 320 and the network device 330 (e.g., network integration router) serve as the entry point for the user device 310 to build out the hardware inventory 360. The connectivity from the user device 310 may be performed directly or through additional network devices to route traffic between devices 320 and 330 to enable communication therebetween.

In embodiments, the user device 310 may be shipped to a customer with the configuration software running thereon, in order to bring an offsite appliance online (e.g., hardware inventory 360 remote from a data center). Generally, the configuration software is functional to set up the hardware inventory 360 to act as a cluster/stamp within the data center. For instance, upon launching the configuration software, a process for setting up the hardware inventory is automatically performed, where the process generally involves the following steps (more fully discussed below): automatically discovering devices by commanding the devices to send traffic; and validating wiring of the devices upon receiving the traffic therefrom.

The user device 310 may further include a template file 312. The template file 312 is generally configured to include a definition of the expected physical topology of the hardware inventory 360, which describes the wiring between devices (e.g., wiring between the TOR switch 350 and the serial device 361). In one instance, the wiring of the hardware inventory 360 is defined in terms of a type of function (e.g., compute or storage) performed by the devices of the hardware inventory 360. Typically, the template file 312 may be provided by a hardware vendor who originally inspected of the hardware inventory 360 during a previous phase of the bootstrap process (e.g., initial set-up phase 220 of the bootstrap process of FIG. 2).

Generally, the phrase "template file" may broadly represent a blueprint of the structure and/or organization of devices within the hardware inventory 360, and it operates to expose expected locations of the devices and wiring between devices within the hardware inventory 360. For instance, the template file 312 may specify that each computing unit 371 and 372 must be connected to a respective slot of the PDU 381, TOR switch 350, and serial device 361, thereby providing a way to discern a network location of the computing units 371 and 372 within the physical topology. In another instance, the template file 312 exposes which serial device 361 is connected to which port of the serial aggregator 320. In another embodiment, the template file 312 may also expose MAC addresses of the devices within the hardware inventory 360. Accordingly, upon abstracting MAC addresses from communications distributed from the devices of the hardware inventory, the configuration software of the user device 310 may compare the intercepted MAC addresses and cross-reference them against the template file 312.

When conducting the discovery and validation phase using the template file 312, a connection between the user device 310 (hosting and running the template file 312) and high-level devices (e.g., serial aggregator 320, network device 330, spines, and network routers) is made. Generally, spines are implemented in one type of physical topology while the network routers are implemented in another type of physical topology (i.e., only one of spines or network routers is used for a particular hardware inventory). As shown, in FIG. 3, the network device is used to represent either a spine or a network router.

These high-level devices are generally preconfigured (e.g., provided with software previously installed thereon) such that at least one type of network device (e.g., network device 330) and at least one type of serial device (e.g., serial aggregator 320) is already configured to talk with the configuration software of the user device 310. For instance, upon hooking up to the network device 330 and serial aggregator 320 to the user device 310, which is typically the only manual setup required, the network device 330 and serial aggregator 320 are pre-configured to route traffic to the rack 310 upon instruction from the user device 310. As mentioned above, the hook-up between the user device 310 and the network device 330 and serial aggregator 320 may be physical wiring (local from onsite customer) or wireless connectivity (remote from service provider). The serial aggregator 320 and network device 330 each represent an entry point to initially discover the wiring of the devices within the rack 301.

Upon establishing connection(s) between the user device 310 and the network device 330 and serial aggregator 320, the discovery process may be commenced. Generally, the discovery process involves automatically inspecting the connections of the devices by accessing the devices in a top-down manner. For example, because the serial aggregator 320 connects first to the serial device 361 (DIGI) and then on down the line to the TOR switch 350 and the PDU 381, the discovery process typically checks and configures the serial device 361 before the TOR switch 350 and the PDU 381. Accordingly, the discovery process might initially target the serial device 361 for inspection, then the TOR switch 350, and then the PDU 381.

Once a device is targeted and accessed, inspection of connections involves comparing information from each of the two communication channels (network and serial) against the template file. As mentioned above, every device within the rack 301 may be accessed from a serial communication channel (via the serial aggregator 320) and a network communication channel (via the network device 330) in order to provide verification of the wiring. Verification of the wiring may initially involve pulling and/or reading a MAC address from a targeted device via serial connectivity (thick dashed lines), where the serial (first) MAC address is associated with a serial port to which the targeted device is expected to be connected. Next, wiring verification may involve pulling and/or reading a MAC address from the targeted device via network connectivity (thin dashed lines), where the network (second) MAC address is associated with a network port to which the targeted device is expected to be connected. It should be noted that the ordering of the MAC-address verification over the serial (first) and the network (second) may be reversed and still enable the embodiments of the present invention.

Once the serial (first) MAC address and the network (second) MAC address are discovered, they are compared against one another to determine if a match between exists. If a match exists, it may be assumed that an internal connection between the targeted device, serial aggregator 320, and the network device 330 within the rack 301 is proper (e.g., no one has accidentally wired the targeted device to another serial/network device in an unexpected location). Also, if a match exists, the user device 310 may make a record that the network and serial connectivity to the targeted device is valid. Further, comparison of the serial (first) MAC address and the network (second) MAC address against the template file 312 may both establish correlations of wiring between the actual hardware inventory and an expected location within the template file 312.

If the user device 310 fails to retrieve a MAC address via one or more channels, the configuration software may record an indication that the targeted device is either mis-wired (e.g., ports connected to separate devices) or has severed wiring (e.g., wiring from the expected port does not exist) and/or may report an error to the customer. Further, if no match exists, the configuration software of the user device 310 may continue checking other ports to determine whether the targeted device is connected within an acceptable range of ports. That is, if the retrieved port value varies from an expected port value, yet is determined to function properly as presently wired, then the unexpected, retrieved port value may be recorded without triggering a failure. In this way, the discovery process can forgive certain inconsistencies with the template file 312 (i.e., the targeted device is not wired as originally specified in the template file 312) as long as the targeted device is within a predefined range of acceptable ports, thus, allowing the discovery process to adapt to minor inconsistencies.

For example, if there is no strict restriction on which port the TOR switch 350 is connected to the network device 330, the discovery process may simply check for the MAC address of the TOR switch 350 across a range of ports on the network device 330. Once the port address is identified that received the TOR switch's 350 MAC address, the identified port is reported to the customer for error tracking purposes and the template file 312 is updated with the correct information (e.g., identified port is mapped to the TOR switch 350).

By building flexibility into the discovery process, a level of adherence to the template file 312 is metered in order to accept some errors in wiring. Thus, instead of wire-checking against the template file 312 in a strict fashion and raising an alarm upon every inconsistency, the discovery process is allowed to inspect a range of ports and memorialize the ports on the template file 312 (or separate result file) that are identified as being connected to the targeted device. However, in some instances, strict adherence to the ports expected by the template file 312 is required. In one example, the template file 312 is strictly adhered to when a secure port is earmarked for connection to the targeted device. In another example, the template file 312 is strictly adhered to when the port identified as being connected to the targeted device improperly crosses a security boundary or is outside an acceptable range of ports allocated for the targeted device.

In an exemplary embodiment, to assist with discovering the existence and wiring/connections of the targeted device, as well as validating an initial functionality of the targeted device, the discovery and validation phase may involve a configuration process. The configuration process typically includes the following steps: (a) applying network configuration settings to the firmware of the targeted device such that the targeted device is usable as a baseline for network discovery; and (b) assigning the targeted device an IP address, such that the IP address may be advertised to other network/serial devices when attempting to access the targeted device.

With respect to FIG. 3, the configuration process may involve consecutively or concurrently configuring the serial device 361, the TOR switch 350, and the PDU 381 to have a proper network interface (network interfaces are typically faster and more reliable than serial interfaces) for the purposes of discovery. This process of configuring may be implemented upon the user device 310 initially hooking up to the rack 301. In one instance, the configuration process may involve sending a signal over the serial communication channel to the serial device 361 to install within the serial device 361 configuration settings that make the serial device 361 accessible and compliant. Further, the configuration settings enable the serial device 361 to automatically advertise itself upstream to the network or serial devices. In embodiments, automatic upstream advertisement entails the serial device 361 sending its MAC or IP address over network and/or serial communication channels without prompting. Once the configuration settings are installed to the serial device 361, they may be installed to downstream devices, such as the TOR switch 350, the PDU 381, and the computing units 371 and 372.

A particular example of installing the configuration settings to a target device will now be provided. Initially, protocol(s) (e.g., ARP or DHCP protocols) that are designed to turn on a special mode within the targeted device are installed. When the special mode is turned on, the targeted device begins automatically sending out data packets with its MAC or IP address, or advertising itself to the network. Accordingly, when activated, the special mode enables network visibility of the targeted device (if it is not already preconfigured to do so). In operation, the special mode allows for receiving an identifier (e.g., IP or MAC address) of the target device via the serial and network communication channels without the user device 310 actively reaching out to the targeted device and pulling the identifier therefrom.

As mentioned above, the identifiers that traverse through the serial and network communication channels are collected by the user device and matched against each other and against the template file 312. If a match exists, the targeted device may be configured with operational credentials and other fabric-required software. Further, if a match exists with respect to the PDU 381, configuration settings with protocols may be installed to the PDU 381 that allow it to be controlled by the user device 310 such that the PDU 381 selectively distributes power to targeted computing units 371 and 372 sequentially.

It should be appreciated and understood that the steps above for implementing the discovery and validation phase upon the network and hardware devices may be executed iteratively such that the serial devices (e.g., serial device 361) and the network devices (e.g., TOR switch 350) may be targeted recursively to validate location of and connections to each of the computing units 371 and 372 in succession. Thus, the entire wiring pattern of the rack 301 may be distilled from simply repeating the discovery process described above, which may be distilled to the following steps: detecting at a serial device a serial (first) MAC address being advertised from a targeted device via serial communication channels; detecting at a network device a network (second) MAC address being advertised from the targeted device via network communication channels; comparing the first and second MAC addresses against each other to ensure the targeted device's wiring is correct and fully functional; and comparing the first and second MAC addresses against the template file 312 to ensure a location of the targeted device is as expected. If so, configure the targeted device with configurations settings, protocols, credentials, etc.

Although various different configurations of hardware inventories have been described, it should be understood and appreciated that other types of suitable machines that allow for increasing storage/computing capacity and suitable devices that route traffic between the machines may be used, and that embodiments of the present invention are not limited to the layouts of the ecosystem 300 described herein. That is, various other types of physical topologies of devices may appear within the hardware inventory 360, which are considered by embodiments of the present invention.

In accompaniment to varying topologies, the template file 312 may vary correspondingly, such that the procedure for cross-referencing and validation may adapt to modifications in wiring (network schema) and changes in devices (hardware schema). Consequently, as opposed to entirely rewriting the validation code each time a modification is made to the physical topology of a new hardware inventory 360 to be built out, a new template file 312 is simply generated based on the new hardware inventory 360 while the bootstrap-process phases for validating the network and hardware devices remain unchanged in procedure. Thus, the ability to apply the bootstrap process to various physical topologies that presently exist—as well as to those that have not yet been developed—without overhauling the workflows of the respective phases allows for building out and deploying hardware inventories beyond a standard, uniform set up of wiring and devices.

It should be noted that the template file 312 may be provided at the user device 310, or maintained at a data store that is in communication with the user device 310. Generally, the template file 312 reveals the identity of the devices assembled to the racks 301-303 as well as the pattern of internal wiring between the devices. In one instance, the template file 312 includes a hardware schema that defines the expected locations and addresses (e.g., MAC addresses, IP addresses, or other unique identifiers assigned to network interfaces for directing communications on the physical network segments) for mapping the computing units 371 and 372. For example, the hardware schema may specify that rack 301 include hardware devices identified as $BLADE_1$, and $BLADE_2$ (computing devices 371 and 372), while rack 301 is equipped with a network device identified as $TOR_1$ (TOR switches 350).

Further, the hardware schema may be programmed within the user device 310 having a default set of credentials from a vendor of the hardware inventory 360 that permits initial access to the serial device 361. By way of background, the credentials and/or addresses may be entered to the hardware schema upon a hardware-acceptance technician of the vendor scanning barcodes of devices shipped within the hardware inventory 360.

In another instance, the template file 312 includes a topology schema that defines internal wiring between the TOR switch 350, the computing units 371 and 372, the PDU 381, and the serial device 361. Typically, the topology schema specifies wiring for various functional types (e.g., storage and compute) separately. In an exemplary embodiment, the topology schema includes ranges of ports within the serial aggregator 320 that are allocated to communicating with the serial devices 361 via serial-based connection. Also, in embodiments, the topology schema specifies expected slots within the allocated port ranges in which links to certain devices should occur for successful validation. For example, the topology schema may specify that slot 'A' of the range of ports at the network device 330 is designated to link with $TOR_1$ (TOR switch 350), while slot 'B' of the range of ports at the $TOR_1$ is designated to link with $BLADE_2$ (computing unit 372). In another example, the topology schema may specify that slot 'C' of the range of ports at the serial aggregator 320 is designated to link with the serial device 361, while slots 'D' and 'E' of the range of ports at the serial device 361 are designated to link with $BLADE_2$ (computing unit 372) and $PDU_2$ (PDU 381), respectively. Thus, the hardware and topology schemas, in conjunction, provide a way to identify physical locations of the hardware and network devices from perceived network communications.

Figure 4:
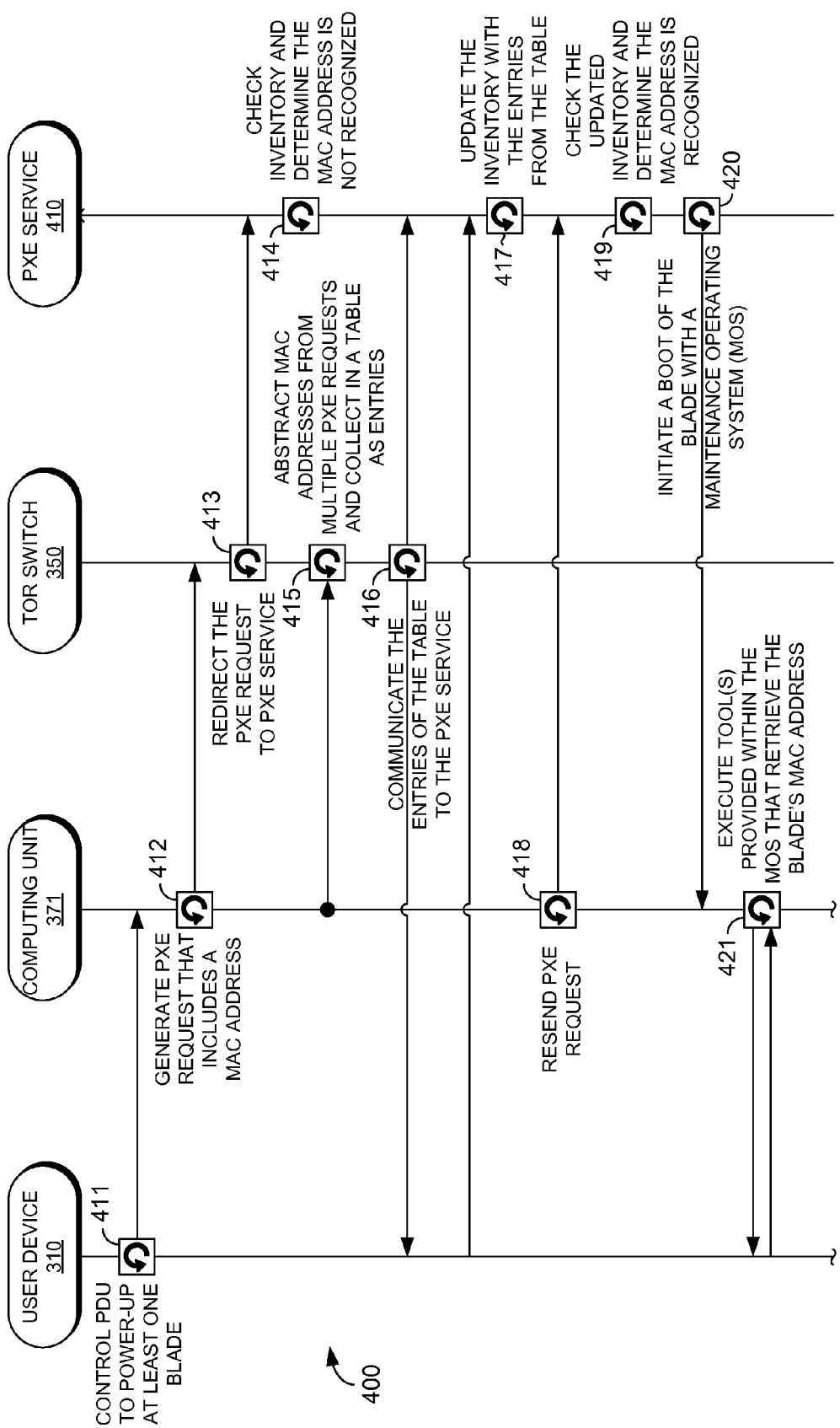
FIG. 4 is an operational flow diagram illustrating a high level overview of a technique for using a remote-boot mechanism to validate the wiring of devices within a hardware inventory of one embodiment of the present invention.
Figure 4:
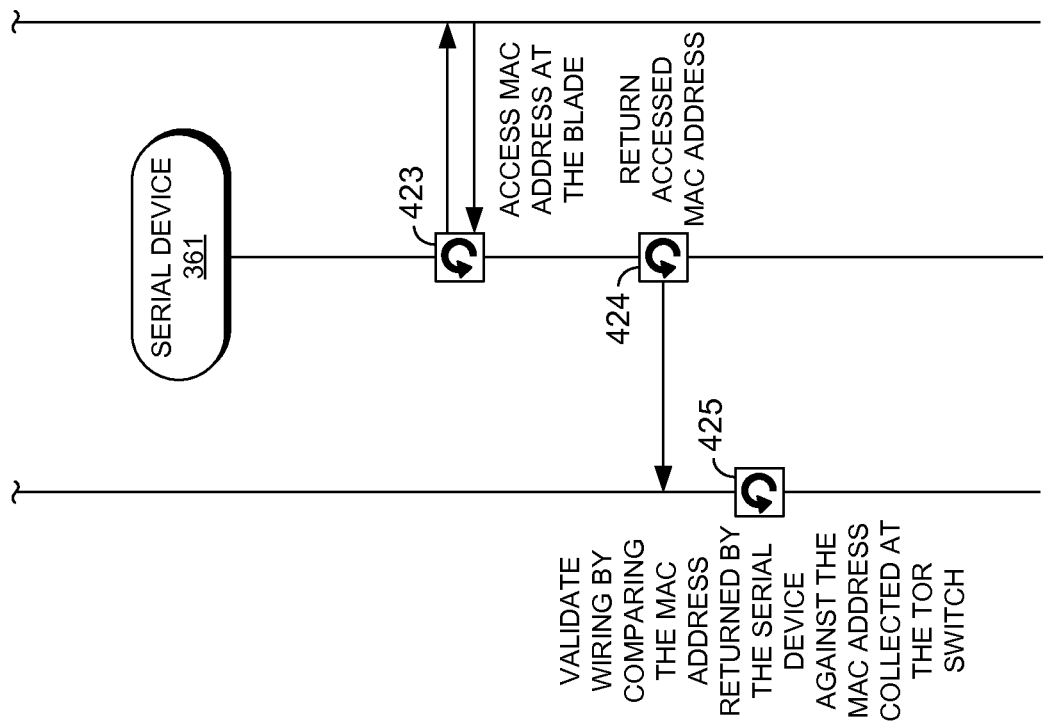

At this point, the configuration software on the user device 310 may begin discovering and validating device locations and wiring by controlling the PDU 381 to selectively supply power to the computing units 371 and 372. This process for selectively supplying power will be described with reference to FIG. 4. Generally, FIG. 4 represents an operational flow diagram illustrating a high level overview of a technique for using a remote-boot mechanism to validate the wiring of devices within a hardware inventory of one embodiment of the present invention. The technique for validating wiring of the devices may include using the remote-boot mechanism 311 of FIG. 3 to validate specific servers within each of the racks 301-303 of the hardware inventory 360. On a high level, the validation is performed by recursively triggering each port of the PDU 381 and rebooting particular servers and using the remote-boot mechanism 311 (e.g., preboot execution environment (PXE) boot) to discover the particular servers' physical and network locations (e.g., configuration within the rack 301). Once the particular servers' physical and network locations are discovered, they are verified against a rack-content specification (e.g., within the template file 312) to recognize any missing or nonresponding devices. In this way, the technique for validating wiring allows for verifying three types of connectivity: a power connection, a network connection, and a serial connection.

Detailed steps of the technique for validating wiring of a rack of the hardware inventory will now be discussed. Initially, the devices of the rack are preconfigured to advertise an identifier (e.g., IP or MAC addresses) when turned on. Accordingly, the user device 310 is configured to turn on, or control the power-up via the PDU 381, to at least one blade. This is depicted at operation 411 of FIG. 4. It should be noted that the devices may be turned on individually (e.g., computing unit 371) or together in groups. When the computing device 371 is turned on, it will automatically send out a PXE request via the network communication channel. This PXE request includes the MAC address of the computing unit 371, as depicted at operation 412. The TOR switch 350 is configured to receive the PXE request from the computing unit 371 over the network communication channel and redirect the PXE request to a PXE service 410, as depicted at operation 413.

As depicted at operation 414, the PXE service 410 may attempt to abstract a MAC address of the computing unit 371 and compare it to an inventory. Typically, the MAC address will not be recognized upon the PXE request being initially received. When the MAC address is not recognized by the PXE service 410, no action is taken thereby. Further, upon failing to recognize the MAC address at the PXE service 410, the TOR switch 350 may abstract the MAC address from the PXE request, as depicted at operation 415. In one embodiment, abstracting the MAC address may involve parsing the PXE request being automatically distributed by the computing device 371 and adding the MAC address to a table hosted at the TOR switch 350.

As depicted at operation 416, once the MAC address is collected at a table at the TOR switch 350, the TOR switch 350 communicates with the user device 310 to reconfigure the PXE service 410 to add the MAC address to its inventory. Specifically, as depicted at block 417, the PXE service 410 updates its inventory with the entries from the table maintained by the TOR switch 350. Generally, the PXE service 410 will only boot those servers that it has listed within the inventory. Thus, the PXE service 410 boots by inventory during validation.

Accordingly, upon the computing unit 371 resending the PXE request, as depicted at operation 418, the PXE service 410 will recognize the MAC address conveyed within the PXE request. In particular, the PXE service 410 will check the MAC address against the updated inventory and identify that the MAC address is listed as an entry, as depicted at operation 419. Once the MAC address is recognized by the PXE service 410, the PXE service 410 starts to respond to the PXE requests from the computing unit 371 by booting it with a maintenance operating system (MOS), as depicted at operation 420. By way of example, the MOS may represent a light-weight version of Windows OS with special tools. However, it should be noted that the MOS may be any image of an OS that assists with the validation of a server. Advantageously, the MOS gives the user device 310 the ability to load additional specialized tools and/or applications onto the computing unit 371.

In another embodiment, when conducting the initial wire-check with the serial device 361, the computing unit 371 is determined to have a network configuration (e.g., provided with production software), then the user device 310 is not prompted to change the OS. Instead, the user device 310 is designed to perform a rudimentary ping-network command to retrieve the MAC address or to simply enable protocol at the computing unit, if equipped with the special mode, to advertise the MAC address.

As depicted at operation 421, the user device 310 will begin to access the servers (e.g., computing device 371) from the serial communication channel once booted with the MOS. Further, the user device 310 may execute tools provided on the MOS, such as a tool that retrieves the MAC address of computing unit 371, which provides confirmation of the serial wiring thereto. Or, the user device 310 may compare an initial printout of the computing unit's 371 MAC address to the serial device 361 prior to booting the computing unit 371. However, using the MOS to manage the format at which the MAC address is delivered is advantageous in order to eliminate the step of parsing a raw output printed from the computing unit 371.

Next, the connection of power to the computing unit 371 is confirmed. As mentioned above, the servers are typically turned on one-by-one, as opposed to in parallel, for risk of confusion with cross-wiring. Upon the user device 310 triggering the PDU 381 to turn on the computing unit 371, the serial device 361 may access the MAC address from the computing unit 371 (see operation 423) and return the accessed MAC address to the user device 310 (see operation 424).

As depicted at operation 425, upon receiving the MAC address, the user device 310 may validate the power wiring of the computing unit 371 by comparing the MAC address returned by the serial device 361 against the MAC address collected by the TOR switch 350. As a second check, the user device 310 may confirm that the MAC address of the computing unit 371 disappears from the network (i.e., port goes silent) and output to the serial device 361 ceases upon powering down the computing unit 371. If at any point, there is an inconsistency in the MAC address being advertised by the computing unit 371 and an expected MAC address previously entered to the table and/or inventory, a notification is generated and the inconsistency is stored for future reference.

Figure 5:
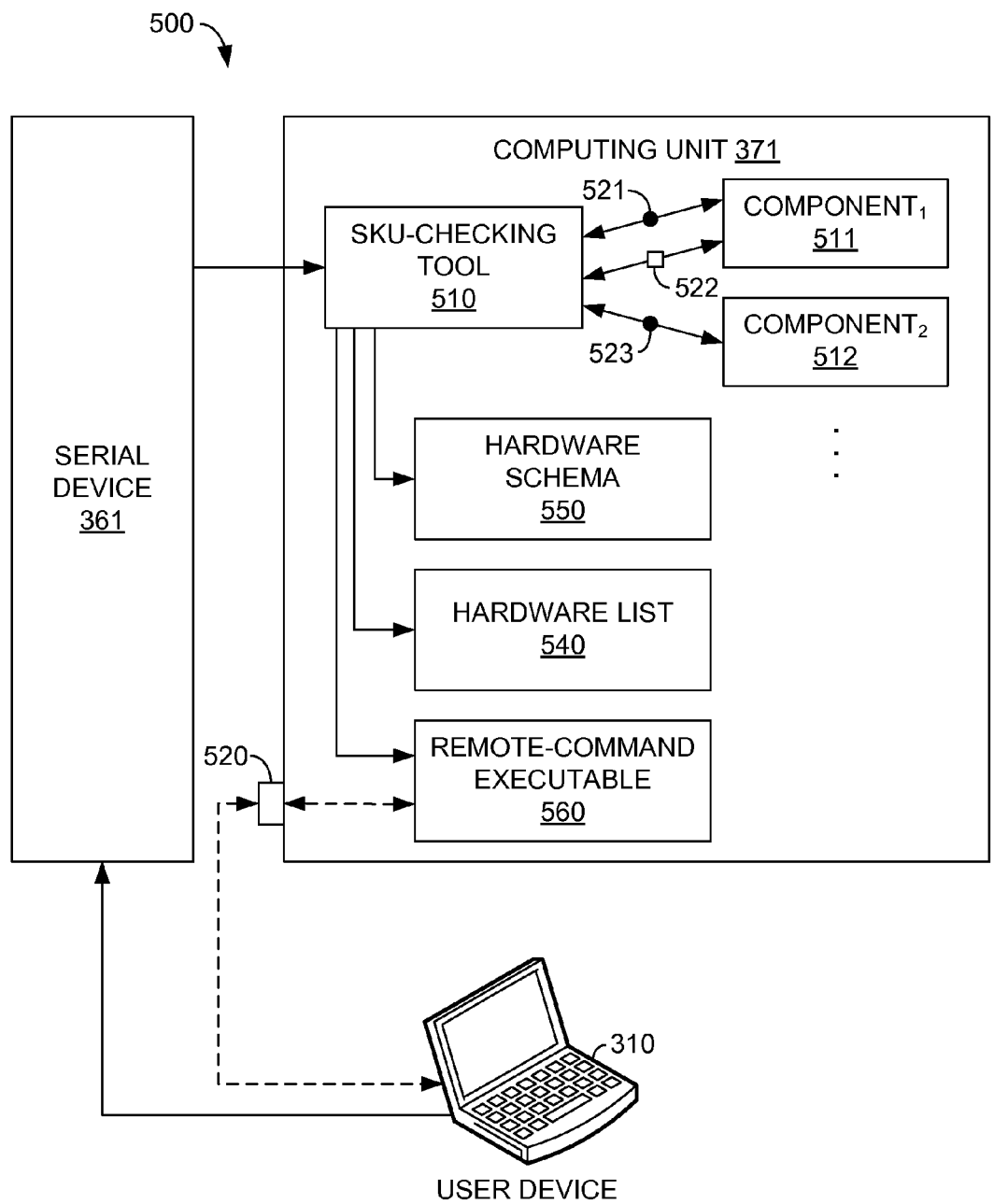
FIG. 5 is a graphical representation illustrating an exemplary system for checking and running tools within the MOS of a device, in accordance with embodiments of the present invention.

Turning to FIG. 5, a graphical representation illustrating an exemplary system for checking and running tools within the MOS deployed on a device, in accordance with embodiment of the present invention, will be discussed. Initially, the user device 310 is connected to the serial device 361 of the rack 301 and the computing unit 371 via a port 520. Once the PXE service 410 boots the computing unit 371 with the MOS, the user device 310 will have the ability to run tools embedded on the MOS. Generally, running these tools allows for deep discovery and validation of components (e.g., reference numerals 511 and 512 of FIG. 5) on the devices (e.g., computing unit 371).

In operation, according to embodiments of the present invention, the computing unit 371 is booted with the MOS that runs a special environment designed for, among other things, configuration and validation of software and hardware components thereon. The special environment of the MOS may include a stock-keeping unit (SKU)-checker tool 510 and a hardware schema 550, which may be dynamically generated using the SKU-checker tool 510 upon deployment. These tools on the MOS allow the computing unit 371 to communicate with the serial device 361 upon executing commands issued externally (by the user device 310) or internally.

Further, the tools allow for running various operations upon execution. For instance, upon execution, the SKU-checker tool 510 may enumerate hardware properties of the computing unit 371. Execution may involve calling the SKU-checker tool 510 using the serial device 361 in order to commence the verification process locally on the computing unit 371, where the results of the verification process are conveyed to the serial device 361. In one example of the verification process, the SKU-checker tool 510 uses a plug-and-play interface to discover the components 511 and 512 provisioned on the computing unit 371. These components 511 and 512 include, but are not limited to, devices, drivers, software, and other items on the hardware of the computing unit 371. Further, the amount of components 511 and 512 provisioned on the computing unit 371 is not limited to those illustrated on FIG. 5 and may include any number.

Discovering the components 511 and 512 using the plug-and-play interface allows the SKU-checker tool 510 to pull information 521 and 523 associated with the components 511 and 512, from the computing unit 371. In one example, the information 521 and 523 includes a type of component that is represented by the components 511 and 512, which may be distilled by hardware properties thereof. Further, based on the type of component, the SKU-checker tool 510 may carry out a deeper scan of the computing unit 371 to extract detailed data 522, such as BIOS, memory (e.g., partition size), hard drives (e.g., model number), CPU, and identity of manufacturer. In embodiments, the extracted detailed data 522 comprises a set of criteria considered relevant for validation of the components 511 and 512 of computing unit 371. Once the extracted detailed data 522 is collected, the SKU-checker tool 510 may perform additional tests to ensure the identified components 511 and 512 meet the set of criteria. For example, the additional tests may comprise determining whether the storage volume of a hard drive on the computing unit 371 satisfies the criteria for cooperating with a fabric operating environment.

The information 521 and 523, as well as the detailed data 522, may be saved to a hardware list 540, which maintains the extracted detailed data 522 for comparison with a hardware schema 550 (e.g., XML document). In embodiments, comparison with the hardware schema 550 may involve matching the detailed data 522 against predefined properties on the hardware list 540. Generally, the hardware schema 550 explains what components should present within the computing unit 371 for furthering validation of the hardware. In one instance, the hardware schema 550 delineates what components are acceptable to exist on the computing unit 371, where exclusion may compromise security of the system. In another instance, the hardware schema 550 delineates what is undesirable to exist on the computing unit 371, where inclusion may compromise security of the system.

In an exemplary embodiment, comparison with the hardware schema 550 against the extracted detailed data 522 involves determining whether the computing unit 371 meets the criteria (predefined properties) of the hardware schema 550. Meeting the criteria may be determined using an exact matching procedure or a variable matching procedure. The exact matching procedure (for required components) identifies that each of the predefined properties of the hardware schema 550 is present and specifically configured to facilitate proper functionality. The variable matching procedure (for optional component) has build-in flexibility within the matching scheme to accept a range of values during comparison. In instance, the variable matching procedure allows for acceptable variations in the type components appearing on the computing unit 371 (e.g., will pass the device if any of five acceptable hard drives are identified). In another instance, the variable matching procedure allows for acceptable variations in the configuration of components (e.g., memory with hardware will pass if it falls within a range from 5 to 10 terabytes in size).

Although both exact and variable matching procedures are described herein, it should be appreciated and understood that other methods for comparing the hardware schema 550 against the extracted detailed data 522 within the hardware list 540 may be employed, and these methods are contemplated by aspects of the present invention. For instance, comparing the hardware schema 550 against the hardware list 540 may involve the following steps: constructing a prohibited device list that includes devices that may cause issues or inconsistencies within the fabric; incorporating the prohibited device list within the hardware schema 550; comparing the extracted detailed data 522 within the hardware list 540 against the prohibited device list; and failing the computing unit 371 if one or more of the items on the prohibited device list match the extracted detailed data 522.

Once the matching procedures are completed, an inspection of the overall results indicates whether the computing unit 371 passes or fails. For instance, if the components 511 and 512 pass the exact, variable, and prohibited matching procedures, the computing unit 371 is passed. If there is a mismatch during performance of any of the matching procedures, the computing unit 371 fails and additional data may be extracted to determine the cause of the failure.

In some embodiments, a remote-command executable 560 may be installed within the MOS of the computing unit 371. Installing the remote-command executable 560 involves establishing a high-speed communication channel (e.g., TCP channel) secondary to the serial communication channel that allows communication between the computing unit 371 and the user device 310, which is presently running the bootstrap-framework software. Installing the remote-command executable 560 further involves launching the remote-command executable 560 using functionality of the MOS. Launching the remote-command executable 560 consequently creates the port 520 (e.g., TCP port) that listens for PXE requests from the computing unit 371. At this point, the user device 310 is connected over the port 520 and may run commands on the MOS over a TCP network connection, which allows for a faster connection when gathering data from the computing unit 371. Further, once launched, the remote-command executable 560 may act as an agent on the computing device 371 that is equipped to inject new executables (logic) onto the MOS or update the MOS by uploading new schema files and tools that repeat the validation of the computing unit 371. In one example, the new executables being injected into the MOS may include stress-testing tools and/or performance-gathering tools.

Process Flows

Figure 6:
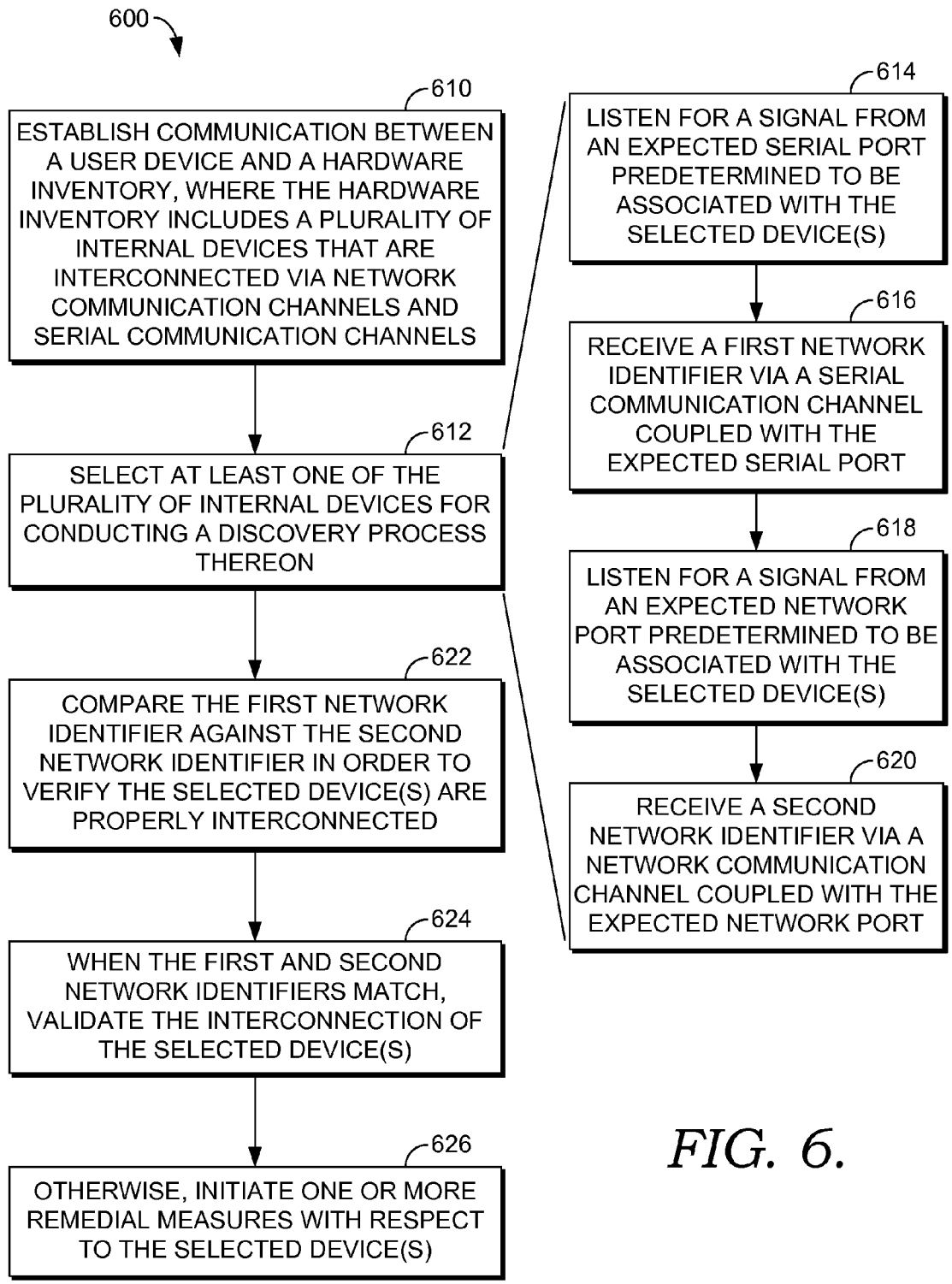
FIG. 6 is a flow diagram showing an overall method for discovering and validating an inventory of hardware being incorporated within a topology of a data center, in accordance with an embodiment of the present invention.

Referring now to FIG. 6, a flow diagram is shown that illustrates an overall method 600 for discovering and validating an inventory of hardware, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described. Initially, the hardware inventory represents a rack, where the rack may include a network device (e.g., TOR switch and serial-access device) and a set of computing units (e.g., set of blades inserted into the rack). The set of blades are typically interconnected between the serial-access device and the TOR switch.

Initially, the method 600 of FIG. 6 involves establishing communication between a user device (e.g., reference numeral 310 of FIG. 3) and a hardware inventory (e.g., reference numeral 360 of FIG. 3), as indicated at block 610. Typically, the hardware inventory includes a plurality of internal devices (e.g., computing units 371 and 372 of FIG. 3) that are interconnected via network communication channels (thin dashed lines) and serial communication channels (thick dashed lines). The method 600 may further involve selecting at least one of the plurality of internal devices for conducting a discovery process thereon, as indicated at block 612.

In embodiments, selecting one of the devices internal to the hardware inventory includes the following steps: listening for a signal from an expected serial port predetermined to be associated with the selected device(s) (see block 614); receiving a first network identifier via a serial communication channel coupled with the expected serial port (see block 616); listening for a signal from an expected network port predetermined to be associated with the selected device(s) (see block 618); and receiving a second network identifier via a network communication channel coupled with the expected network port (see block 620).

Upon receiving signals from the expected ports, the first network identifier is compared against the second network identifier in order to verify the selected device(s) are properly interconnected. This step is indicated at block 622. Upon conducting the comparison, verification of the selected device(s) involves validating the interconnection when the first and second network identifiers match, as indicated at block 624. Otherwise, initiate one or more remedial measures are initiated with respect to the selected device(s), as indicated at block 626.

Figure 7:
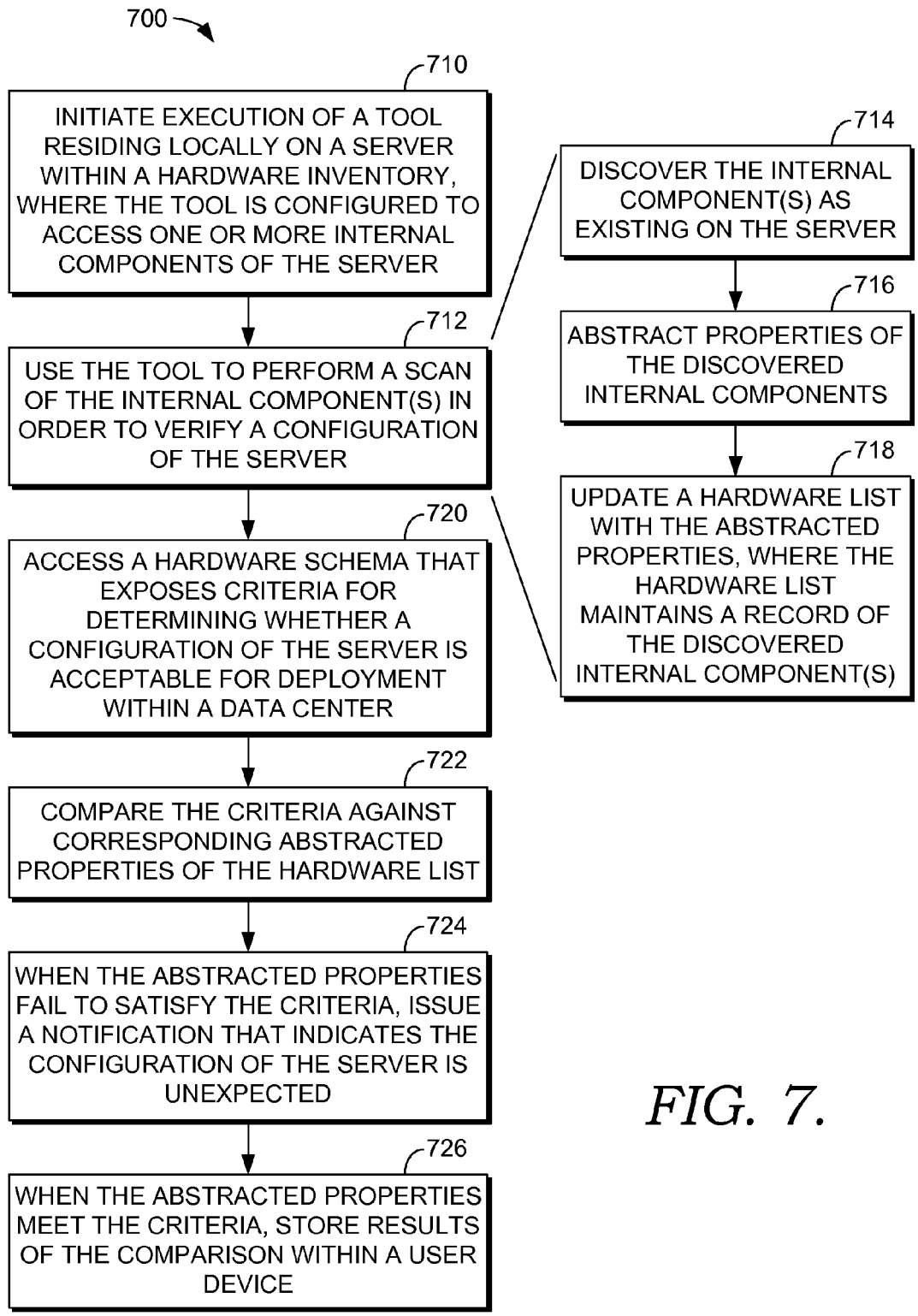
FIG. 7 is a flow diagram showing an overall method for discovering and validating one or more components internal to a server of an inventory of hardware, in accordance with an embodiment of the present invention.

Turning to FIG. 7, a flow diagram showing an overall method 700 for discovering and validating one or more components internal to a server of an inventory of hardware will now be described, in accordance with embodiments of the present invention. The method 700 of FIG. 7 involves the step of initiating execution of a tool residing locally on a server within a hardware inventory, as indicated at block 710. In one instance, the tool is configured to access one or more internal components of the server (e.g., see SKU-checking tool 510 of FIG. 5). As indicated at block 712, the tool is used to perform a scan of the internal component(s) in order to verify a configuration of the server. The process of verifying the configuration of the server involves the following steps: discovering the internal component(s) as existing on the server (see block 714); abstracting properties of the discovered internal components (see block 716); and updating a hardware list with the abstracted properties (see block 718). Typically, the hardware list maintains a record of the discovered internal component(s).

Upon building the hardware list, a hardware schema is accessed, as indicated at block 720. Generally, the hardware schema exposes criteria for determining whether a configuration of the server is acceptable for deployment within a data center. As indicated at block 722, the criteria of the hardware schema (e.g., reference numeral 550 of FIG. 5) are compared against corresponding abstracted properties of the hardware list (e.g., reference numeral 540 of FIG. 5). When the abstracted properties fail to satisfy the criteria, as indicated at block 724, a notification is issued that indicates the configuration of the server is unexpected. When the abstracted properties meet the criteria, as indicated at block 726, results of the comparison are stored within a user device.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. One or more computer-readable storage devices having computer-executable instructions embodied thereon that, when executed, perform a method for discovering, configuring, and validating an inventory of hardware, the method comprising:
    establishing communication from a user device to the hardware inventory, wherein the hardware inventory includes a plurality of internal devices that are interconnected via network communication channels and out-of-band communication channels;
    selecting at least one of the plurality of internal devices for conducting a discovery process thereon, wherein the discovery process comprises:
        (a) listening for a signal from an expected out-of-band port predetermined to be associated with the at least one selected device;
        (b) receiving a first network identifier via an out-of-band communication channel coupled with the expected out-of-band port;
        (c) listening for a signal from an expected network port predetermined to be associated with the at least one selected device; and
        (d) receiving a second network identifier via a network communication channel coupled with the expected network port;
    comparing the first network identifier that is received from the out-of-band communication channel against the second network identifier that is received from the network communication channel in order to verify the at least one selected device is properly interconnected;
    determining that the at least one selected device is properly interconnected when the first network identifier and second network identifiers match;
    validating the interconnection of the at least one selected device; and
    otherwise, determining that the at least one selected device is not properly interconnected when the first network identifier and second network identifiers do not match; and
    initiating one or more remedial measures with respect to the at least one selected device.

2. The computer-readable storage devices of claim 1, wherein the at least one selected device comprises an out-of-band device or a network switch, and wherein the interconnection of the at least one selected device includes a coupling to an out-of-band aggregator over the out-of-band communication channel and a coupling to a network device over the network communication channel.

3. The computer-readable storage devices of claim 2, wherein the at least one selected device comprises a server within the hardware inventory, and wherein the interconnection of the at least one selected device includes a coupling to the out-of-band device over the out-of-band communication channel and a coupling to the network switch over the network communication channel.

4. The computer-readable storage devices of claim 3, wherein the server within the hardware inventory represents a blade within a rack.

5. The computer-readable storage devices of claim 3, wherein selecting at least one of the plurality of internal devices for conducting a discovery process thereon comprises targeting types of devices in the following order: network switches, out-of-band devices, power-distribution unit (PDUs), and servers.

6. The computer-readable storage devices of claim 5, the method further comprising configuring the out-of-band devices to send instructions to the PDUs, respectively, wherein the PDUs are responsible for selectively supplying power to the servers, wherein the instructions cause the PDUs to deliver power to at least one selected device and to withhold power from at least one non selected device of the plurality of internal devices.

7. The computer-readable storage devices of claim 6, wherein the first and second network identifiers include respective media access control (MAC) addresses that identify a location of the at least one selected server within a physical topology of the hardware inventory, and wherein the method further comprises accessing a template file that exposes a mapping between the MAC addresses and the plurality of internal devices, respectively.

8. The computer-readable storage devices of claim 7, the method further comprising cross-referencing the first and second network identifiers received from the at least one selected device against the template file to verify an identity of the at least one selected device.

9. The computer-readable storage devices of claim 8, wherein, upon determining the first and second network identifiers do not match, the one or more remedial measures comprising:
    searching for a signal carrying the MAC address associated with the at least one selected device at one or more unexpected out-of-band ports; or
    searching for a signal carrying the MAC address associated with the at least one selected device at one or more unexpected network ports, wherein the MAC address is mapped to the at least one selected device within the template file.

10. The computer-readable storage devices of claim 9, the method further comprising:
    identifying an out-of-band port of the unexpected out-of-band ports that exposes the MAC address of the at least one selected device; and
    cross-referencing the identified out-of-band port against the template file to determine whether the identified out-of-band port corresponds with a range of acceptable out-of-band ports that are allowable for use by the at least one selected device.

11. The computer-readable storage devices of claim 10, the method further comprising
    identifying a network port of the unexpected network ports that exposes the MAC address of the at least one selected device; and
    cross-referencing the identified network port against the template file to determine whether the identified network port corresponds with a range of acceptable network ports that are allowable for use by the at least one selected device.

12. The computer-readable storage devices of claim 1, wherein the signal provided from the at least one selected device is designed to capture an indicia of respective out-of-band ports or network ports that are traversed while being transmitted within the hardware inventory.

13. The computer-readable storage devices of claim 1, wherein, upon performing the discovery process, the method comprises configuring the at least one selected device with an Internet protocol (IP) address.

14. The computer-readable storage devices of claim 1, wherein the template file includes a topology schema that specifies an expected location of the at least one selected device, and wherein the topology schema is employed by the user device to verify the hardware inventory is properly wired, and wherein the topology schema comprises at least one of wiring rules, device configuration, or device locations.

15. The computer-readable storage devices of claim 1, wherein the template file includes a hardware schema that specifies which components are expected to reside within the at least one selected device, and wherein the hardware schema is employed by the user device to verify an internal configuration of the at least one selected device.

16. A computerized method for executing discovery, validation, and configuration tools on a server of an inventory of hardware, the method comprising:
   initiating execution of at least one tool residing locally on the server within the hardware inventory, wherein the at least one tool is configured to access the one or more internal components of the server;
   using the at least one tool to perform a scan of the one or more internal components in order to verify a configuration of the server, wherein the scan comprises:
   (a) discovering the one or more internal components as existing on the server;
   (b) abstracting properties of the discovered one or more internal components; and
   (c) updating a hardware list with the abstracted properties, wherein the hardware list maintains a record of the discovered one or more internal components;
   accessing a hardware schema that exposes criteria for determining whether a configuration of the server is acceptable for deployment within a data center;
   comparing the hardware schema that exposes criteria for determining whether the configuration of the server is acceptable for deployment against corresponding abstracted properties of the hardware list discovered in the one or more internal components;
   when the abstracted properties fail to satisfy the criteria, issuing a notification that indicates the configuration of the server is unexpected; and
   when the abstracted properties meet the criteria, storing results of the comparison within a user device.

17. The computerized method of claim 16, wherein the at least one tool is injected within a maintenance operating system (MOS) installed on the server, and wherein the at least one tool is executed upon performing a boot of the MOS.

18. The computerized method of claim 17, wherein the execution of the at least one tool is initiated upon the user device remotely booting the server.

19. The computerized method of claim 17, wherein executing the at least one tool comprises at least one of executing a stress-testing tool, a firmware update tool, a firmware validation tool, or a firmware configuration tool.

* * * * *